United States Patent [19]

Rech

[11] 4,373,306
[45] Feb. 15, 1983

[54] COUPLING FORMATION FOR THE INTERFITTING OF STRUCTURAL ELEMENTS

[75] Inventor: Jacques Rech, Le Chesnay, France

[73] Assignee: Allibert Exploitation, Grenoble, France

[21] Appl. No.: 127,310

[22] Filed: Feb. 5, 1980

[51] Int. Cl.³ ............................................. E01C 5/20
[52] U.S. Cl. .......................................... 52/98; 52/590
[58] Field of Search ................. 52/594, 98, 100, 595, 52/436, 125, 589, 590, 591; 404/41

[56] References Cited

U.S. PATENT DOCUMENTS

| | | | |
|---|---|---|---|
| 1,088,040 | 2/1914 | Stanton | 52/595 |
| 1,246,926 | 11/1917 | Hutchisson | 52/125 |
| 1,722,682 | 7/1929 | Rota | 52/594 |
| 2,115,160 | 4/1938 | Fowler | 52/100 |
| 2,560,731 | 7/1951 | Miller | 52/125 |

FOREIGN PATENT DOCUMENTS

| | | | |
|---|---|---|---|
| 138651 | 4/1934 | Austria | 52/98 |
| 703901 | 4/1966 | Italy | 52/594 |
| 157274 | 9/1932 | Switzerland | 52/98 |

*Primary Examiner*—John E. Murtagh
*Attorney, Agent, or Firm*—Karl F. Ross

[57] ABSTRACT

A structural element, such as a section of a duckboard (e.g. a landing mat) to be removably fastened to a similar section, has one or more edges provided with male coupling formations adapted to be converted into complementary female formations by breaking off a projecting part thereof. The projecting part is generally T-shaped, with its frangible stem rising from the bottom of a preferably dovetail-shaped recess. Such an element can therefore be readily joined to another element having a mortise complementary to the head of the T or a tenon complementary to the recess.

6 Claims, 3 Drawing Figures

U.S. Patent     Feb. 15, 1983     4,373,306
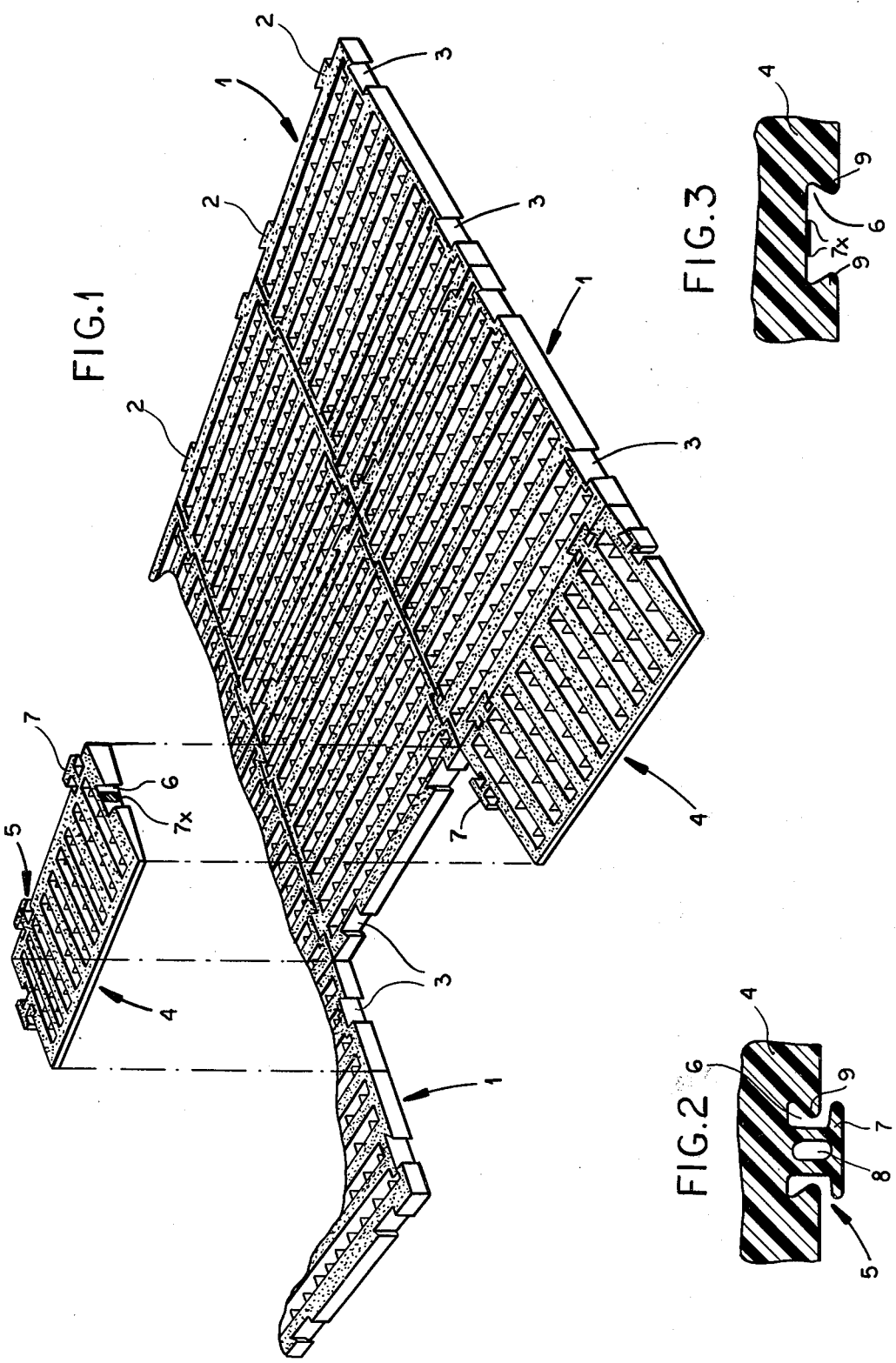

COUPLING FORMATION FOR THE INTERFITTING OF STRUCTURAL ELEMENTS

FIELD OF THE INVENTION

My present invention relates to an assembly of structural elements which are detachably interconnected by means of interfitting complementary coupling formations provided on edges angularly adjoining respective faces thereof.

BACKGROUND OF THE INVENTION

In assemblies of this nature it is customary to provide the constituent elements with mutually complementary male and female coupling formations referred to hereinafter as tenons and mortises. In the case of plastic elements, the tenons are molded as integral projections whereas the mortises are simply formed as undercut recesses which are laterally accessible to facilitate removal from the mold as well as insertion of a tenon from an adjoining element upon assembly.

This technique is entirely satisfactory when each structural element has its preassigned place in the completed assembly. In many instances, however, it is desirable to rearrange some of these elements or to add further components of a similar nature in order to meet different requirements, e.g. to fill up a variable area or volume. If the assembly is a mat, for example, it may have to be restructured in accordance with the ground or floor space to be covered. In such an instance, however, it may happen that two tenons or two mortises confront each other when a given component is relocated from one position to another. This makes it necessary to store a significant number of spare components to be used only for certain configurations.

OBJECT OF THE INVENTION

The object of my present invention, therefore, is to provide a structural element of the type referred to with means for facilitating different modes of assembly, thereby reducing the requisite number of spare components and the costs involved in their manufacture and storage.

SUMMARY OF THE INVENTION

In accordance with my present improvement, a coupling formation on an edge of at least one structural element of such an assembly comprises an undercut recess, preferably of dovetail shape, and a generally T-shaped projection rising therefrom to define therewith a hybrid-type coupling formation, the stem of the "T" being frangibly secured to the bottom of the recess while its overhanging head has a profile substantially complementary to the inverted profile of the recess which is exposed at and therefore accessible from a face of the element angularly joining its aforementioned edge. Thus, the coupling formation normally operates as a tenon but can be converted into a mortise by breaking off the stem at its bottom whereupon the laterally accessible recess can receive either a conventional tenon or the head of a similar T-shaped projection on another structural element.

The break-off of the stem is a simple matter in the case of molded structural elements of plastic material.

BRIEF DESCRIPTION OF THE DRAWING

The above and other features of my invention will now be described in detail with reference to the accompanying drawing in which:

FIG. 1 is a perspective view of a mat, referred to hereinafter as a duckboard, assembled from a multiplicity of structural elements partly provided with coupling formations according to my invention;

FIG. 2 is a cross-sectional detail view, drawn to a larger scale, illustrating one such coupling formation in its original state; and FIG. 3 is a view similar to FIG. 2, showing the coupling formation converted from a tenon into a mortise.

SPECIFIC DESCRIPTION

In FIG. 1 I have shown a representative portion of a duckboard as used, for example, on an airplane runway or in a factory yard as a track for wheeled vehicles. The duckboard consists of a multiplicity of interfitted major sections 1 and minor sections 4, all of rectangular configuration, sections 4 being provided with sloping upper surfaces to act as access ramps for the vehicles to be carried. Each section is molded integral from plastic material and is provided along its edges with coupling formations facilitating its detachable connection to adjoining sections. In the case of the major sections or strips 1, these coupling formations are dovetail-shaped tenons 2 on one longitudinal and one transverse edge and mortises 3 on the other two edges.

The two access ramps 4 shown in FIG. 1, in order to interfit with each other and with the adjoining strips 1 in the illustrated position, must have tenons along their raised rear and left-hand lateral edges as well as mortises on their right-hand lateral edges. If, however, the same ramps were to be used in an inverted position at the opposite end of the track or runway, these tenons and mortises would no longer fit the formations on the confronting strip edges. In accordance with my present invention, therefore, I provide each ramp 4 on its raised rear edge and its lateral edges with hybrid-type coupling formations 5 adapted to be used either as tenons (see particularly FIG. 2) or as mortises (FIG. 3).

In its original state, as shown in FIG. 2, each coupling formation 5 comprises a T-shaped projection 7 whose stem rises from the bottom of an undercut dovetail-shaped recess 6 which is flanked by overhanging surface portions 9 of element 4 that in turn are spacedly overhung by the head of the "T". The stem is advantageously formed with a cutout 8 to increase its flexibility and to facilitate its detachment from the ramp 4 at the bottom of recess 6 to form a mortise with a profile complementary to the inverted profile of the tenon formed by projection 7. The break-off points have been indicated at 7x in FIGS. 1 and 3.

The dovetail profile of recess 6 substantially corresponds to that of mortises 3 on strips 1 whereby that recess can be engaged, with positive fit, not only by a projection 7 of another ramp but also by a tenon 2 of a strip.

Prior to the installation of any duckboard, therefore, it is only necessary to procure (in addition to the requisite number of strips) a number of ramps equal to the number of contemplated access points without regard to their actual disposition. Upon a subsequent change in layout, only those ramps (if any) in which tenons will be needed in lieu of previously formed mortises will have to be replaced.

I claim:

1. In an assembly of structural elements detachably interconnected by means of interfitting complementary coupling formations, said elements including related edges and spaced faces, the improvement wherein hybrid-type coupling formations on said angularly related edges of at least one of said elements each comprise an undercut recess flanked by overhanging surface portions and a generally T-shaped projection rising from said recess, said projection having a stem frangibly secured to the bottom of said recess and a head spacedly overlying said overhanging surface portions with a profile substantially complementary to the inverted profile of said recess, the latter being exposed at said faces and laterally accessible from said faces for engagement with positive fit by a tenon of like inverted profile on another of said elements upon break-off of said stem at the bottom of said recess.

2. The improvement defined in claim 1 wherein the profile of said recess is dovetail-shaped.

3. The improvement defined in claim 1 or 2 wherein said one of said elements consists of plastic material.

4. The improvement defined in claim 1 or 2 wherein said elements are sections of a duckboard.

5. The improvement defined in claim 4 wherein said sections consist of molded plastic material.

6. The improvement defined in claim 1 or 2 wherein said stem is formed with a central cutout.

* * * * *